United States Patent [19]

Lón et al.

[11] Patent Number: 4,877,542
[45] Date of Patent: Oct. 31, 1989

[54] THERMAL INSULATING FLUID

[75] Inventors: Jesus R. León; Olegario Rivas; Geza N. Zirczy, all of Caracas, Venezuela

[73] Assignee: Intevep, S. A., Caracas, Venezuela

[21] Appl. No.: 192,194

[22] Filed: May 10, 1988

[51] Int. Cl.⁴ .......................... E04B 1/76; E21B 36/00
[52] U.S. Cl. .................................. 252/62; 252/8.551; 166/57; 166/302
[58] Field of Search ............... 252/8.551, 62; 166/302, 166/57, 901

[56] References Cited

U.S. PATENT DOCUMENTS

| | | | |
|---|---|---|---|
| 3,642,624 | 2/1972 | Howland et al. | 252/62 |
| 3,719,601 | 3/1973 | Jacocks | 252/8.551 |
| 3,778,494 | 12/1973 | Helser | 252/62 |
| 3,831,678 | 8/1974 | Mondshine | 166/901 |
| 3,861,469 | 1/1975 | Bayless et al. | 166/57 |
| 4,258,791 | 3/1981 | Brandt et al. | 166/901 |
| 4,680,059 | 7/1987 | Cook et al. | 252/62 |
| 4,769,161 | 9/1988 | Angstadt | 252/8.551 |

OTHER PUBLICATIONS

Derwent Abstracts, An 80-13210C/08, "Ageing Resistant Fire Protection Medium", German Patent 2833385, 2/14/80.

Primary Examiner—Paul Lieberman
Assistant Examiner—Christine A. Skane
Attorney, Agent, or Firm—Dressler, Goldsmith, Shore, Sutker & Milnamow

[57] ABSTRACT

A thermal insulating fluid which is well suited for the insulation of steam injection wells comprises a heavy oil having an API gravity of not more than 15° and a water content of not more than about 5% by volume as a major liquid portion, a light oil as a minor liquid portion, a smectite-type clay in an amount sufficient to impart thixotropic properties to the fluid, calcium oxide in an amount sufficient to maintain gel strength at elevated temperatures and to inhibit light oil losses through evaporation, and hydrated amorphous sodium silicate with a $SiO_2/Na_2O$ modulus ratio of about 3 to about 4 present in an amount sufficient to reduce thermal conductivity of said thermal insulating fluid.

13 Claims, 2 Drawing Sheets

THERMAL INSULATING FLUID

TECHNICAL FIELD

This invention relates to a thermal insulating fluid for steam injection wells.

BACKGROUND OF THE INVENTION

Heavy oil wells produce oil by depletion from hot formations. Insulation of the oil is required to prevent an increase in oil viscosity due to cooling of the oil during its way to the surface.

The rate of oil production from a heavy oil well can be increased by injecting high pressure steam both into the well and outwardly into the oil reservoir. This procedure heats the fluids in the well and causes an increase in pressure due to thermal expansion of the crude oil. Furthermore, the heating of the oil also causes the lowering of the oil viscosity. Steam usually is injected for a time period that may range from a few days to a month or more. Thereafter, the steam injection is stopped, and the pressure within the well is reduced to cause flow from the reservoir into the well. When the rate of flow of oil from the reservoir into the well diminishes to a level close to the rate of flow for the cold oil, the steam injection is repeated to heat the reservoir again. In this manner, the mobility of the oil that has moved from remote portions of the reservoir to the vicinity of the well is increased and more oil can be recovered.

Several problems have been encountered when practicing the foregoing steam stimulation processes. The most significant of these is the damage to the well casing that results when heat is transferred through the annulus from the well tubing to the casing as the steam flows down the well through the well tubing and overheats the casing. The attendant thermal expansion of the casing may break the bond between the casing and the surrounding cement causing steam leakage between the casing and the oil well wall, casing buckling or failure due to thermal stress. The second significant problem is the loss of thermal energy when the heat transfer takes place between tubing and casing. This results in a poor quality steam at the bottom of the well, and the possibility of having only hot condensate at the bottom of the well. Other problems are the difficulties encountered in placing adequate insulation inside deviated and inclined oil wells, and in insulating very narrow wells.

U.S. Pat. No. 3,618,680 to Jacocks, describes a liquid insulating medium for use in insulating thermal injection wells, wells drilled through permafrost, and pipelines which traverse a permafrost region. The disclosed medium comprises a mineral oil containing from about 1% to about 10% by weight of a fibrous finely-divided magnesium silicate or asbestos. Such an insulating medium is very expensive due to the cost of the highly refined mineral oil used. Additionally, when the magnesium silicate or asbestos concentration in this medium is increased, a very viscous medium results. This makes its placement within an annular space difficult.

U.S. Pat. No. 3,642,624 to Howland et al. describes a thermal insulating fluid for use in the tubing-casing annulus of steam injection wells. The fluid is composed of heavy mineral oil, preferably having an API gravity of less than 30 degrees, a bentonite-organic base compound, and finely divided asbestos fibers. The composition includes soap-forming ingredients, specifically lime and fatty acids, which react adjacent to the steam injection tubing to form a coating of soap on the tubing and to form a gel after the injection of the steam begins. Although this fluid may perform satisfactorily, this type of liquid insulation is also very expensive. Besides, in case of contact with high quantities of water, the coating of soap that is present will be dissolved by the excess of water; as a result the thermal insulating properties of the fluid will diminish.

U.S. Pat. No. 3,831,678 to Mondshine discloses a composition containing organophilic clays together with asbestos as a gelled oil-based packer fluid for wells drilling through permafrost.

The thermal insulating fluid of the present invention overcomes, or at least minimizes, the aforementioned drawbacks of the prior art compositions.

SUMMARY OF THE INVENTION

The present invention contemplates a thermal insulating fluid which is well suited for the thermal insulation of steam injection wells. This thermal insulating fluid is constituted by a heavy mineral oil as a major liquid portion of the composition, light oil as a minor liquid portion of the composition, a smectite-type clay, calcium oxide, and hydrated amorphous sodium silicate having a $SiO_2/Na_2O$ modulus ratio in the range of about 3 to about 4, preferably about 3.3. The heavy mineral oil has an API gravity of no more than about 15° and a water content of no more than about 5 percent by volume. More specifically, the present thermal insulating fluid composition preferably contains about 85% to about 95% by volume of such a heavy mineral oil, about 5% to about 15% by volume of light oil, about 1% to about 5% by weight of a smectite-type clay, about 0.75% to about 5% by weight of calcium oxide and about 1% to about 2% by weight of hydrated amorphous sodium silicate.

A further aspect of the present invention contemplates a granular composition for admixture in the field with extraneous heavy oil and light oil to form a thermal insulating fluid eminently well suited for the thermal insulation of steam injection wells. More specifically, a solid particulate composition comprising a mixture of smectite-type clay, calcium oxide and hydrated amorphous sodium silicate, preferably in a weight ratio of about 3:3:2, respectively, is contemplated.

DETAILED DESCRIPTION OF PREFERRED EMBODIMENTS

Figure 1:
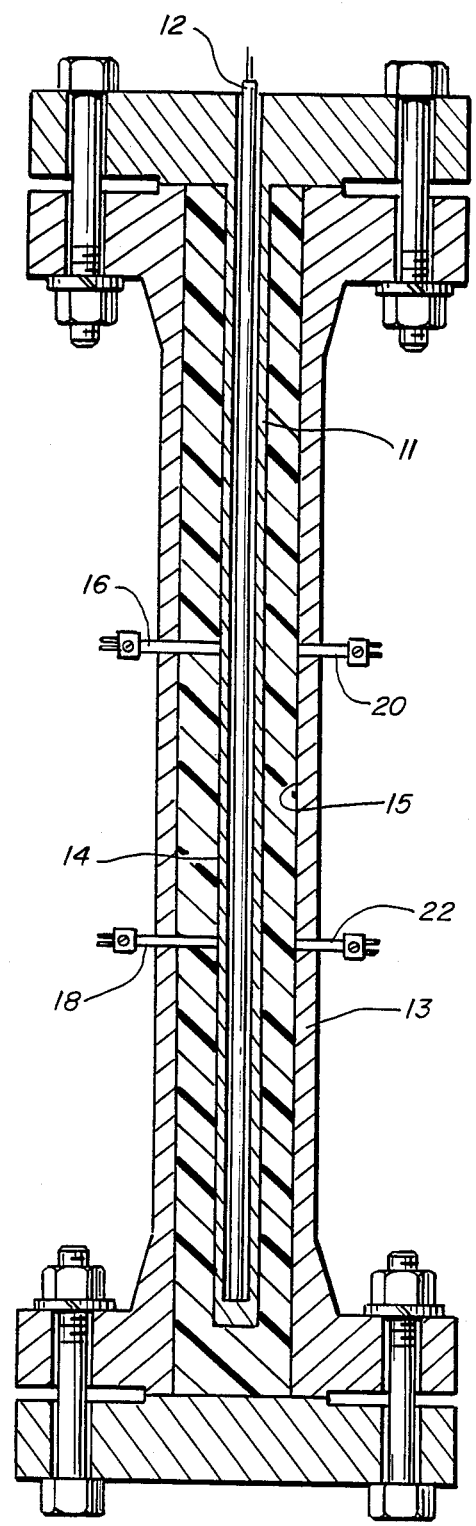
FIG. 1 is a side elevational view of a high pressure vessel suitable for simulating steam injection conditions in a hydrocarbonaceous fluid well.

A thermal insulating fluid embodying the present invention is suitable for placement into the annular space between the tubing and the casing in a steam injection well.

The thermal insulating fluid of this invention comprises a heavy oil/light oil combination having a desired viscosity and includes a gelling agent, such as a smectite-type clay, a stabilizing agent such as calcium oxide, for maintaining gel strength at high temperatures during the injection of steam and to inhibit light oil losses through evaporation, and hydrated amorphous sodium silicate in an amount sufficient to enhance the thermal insulating performance of the resulting gel.

The term "light oil" as used herein and the appended claims denotes any of the products distilled or processed from crude oil up to, but not including, the first lubricating oil distillate. Any of the products beginning with and following the first lubricating oil distillate is referred to as a "heavy oil." See, for example, Bland & Davidson, *Petroleum Processing Handbook*, McGraw-Hill Book Co., New York, N.Y. (1967), p. 14–25.

An exemplary light oil is a parafinic base high gravity oil which has an API gravity of 20° or more, preferably about 22° to about 26° (a specific gravity of about 0.89 to about 0.92) and a water content of no more than about 5% by volume, preferably no more than about 1 to about 2 percent by volume. The usual boiling point range for this oil is about 280° C. (550° F.) to about 425° C. (800° F.). This oil constitutes about 5% to about 15% by volume of the thermal insulating fluid.

The heavy oil may be any asphaltic base low API gravity oil which has an API gravity of no more than about 15°, preferably about 10° to about 15° (a specific gravity of about 0.96 to about 1.0), and a water content of no more than about 5% by volume, preferably no more than about 1 to about 2 percent by volume. The heavy oil is stable at temperatures up to about 300° C. (570° F.) and preferably constitutes about 85% to about 90% by volume of the thermal insulating fluid.

The smectite-type clays are utilized in this invention as thixotropic agents, the addition of which at relatively low levels is sufficient to thicken the composition. Preferably, the present thermal insulating fluid contains about 1% to about 5% by weight of a smectite-type clay. The smectite-type clays useful in this invention usually have a cation exchange capacity of at least 75 milliequivalents per 100 grams of clay. Particularly desirable types of clays are swelling bentonite (montmorillonite), a swelling magnesium-lithium silicate clay (hectorite), and the like.

The clays, especially the bentonite type clays, are preferably converted to the sodium form, if not already in this form. Smectite-type clays prepared synthetically, by either a pneumatolytic or, preferably, a hydrothermal synthesis process, can also be used to prepare the present compositions. Representative of such clays are the following:

Montmorillonite:

$$[(Al_{4-x}Mg_x)Si_8O_{20}(OH)_{4-f}F_f]xM^+$$

where $0.55 \leq x \leq 1.10$, $f \leq 4$ and M is selected from the group consisting of Na, Li, NH$_4$ and mixtures thereof:

Bentonite:

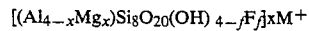

where $0<x<1.10$, $0<y<1.10$, $0.55 \leq (x+y) \leq 1.10$, $f \leq 4$ and M is selected from the group consisting of Na, Li, NH$_4$ and mixtures thereof;

Beidellite:

$$[(Al_{4+y})(Si_{8-x-y}Al_{x+y})O_{20}(OH)_{4-f}F_f]xM^+$$

where $0.55 \leq x \leq 1.10$, $0 \leq y \leq 0.44$, $f \leq 4$ and M is selected from the group consisting of Na, Li, NH$_4$ and mixtures thereof;

Hectorite:

$$[(Mg_{6-x}Li_x)Si_8O_{20}(OH)_{4-f}F_f]xM^+$$

where $0.57 \leq x \leq 1.15$, $f \leq 4$ and M is selected from the group consisting of Na, Li, NH$_4$, and mixtures thereof;

Saponite:

$$[(Mg_{6-y}Al_y)(Si_{8-x-y})O_{20}(OH)_{4-f}F_f]xM^+$$

where $0.58 \leq x \leq 1.18$, $0 \leq y \leq 0.66$, $f \leq 4$ and M is selected from the group consisting of Na, Li, NH$_4$, and mixtures thereof;

Stevensite:

$$[(Mg_{6-x})Si_8O_{20}(OH)_{4-f}F_f]2x\,M^+$$

where $0.28 \leq x \leq 0.57$, $f \leq 4$ and M is selected from the group consisting of Na, Li, NH$_4$ and mixtures thereof.

These clays may be synthesized hydrothermally by forming an aqueous reaction mixture in the form of a slurry containing mixed hydrous oxides or hydroxides of the desired metals with or without, as the case may be, sodium (or alternate exchangeable cation or mixture thereof) fluoride in the proportions defined by the above formulas and the preselected values of x, y and f for the particular synthetic smectite desired. The slurry is then placed in an autoclave and heated under autogenous pressure to a temperature within the range of approximately 100° C. (212° F.) to 325° C. (620° F.), preferably 275° C. (530° F.) to 300° C. (590° F.), for a sufficient period of time to form the desired product. Formulation times of 3 to 48 hours are typical at 300° C. (570° F.), depending on the particular smectite being synthesized, and the optimum time can readily be determined by pilot trials. Representative hydrothermal processes for preparing synthetic smectites are described in U.S. Pat. No. 3,666,407 to Orlemann; U.S. Pat. No. 3,671,190 to Neumann; U.S. Pat. No. 3,844,979 to Hickson; and U.S. Pat. No. 3,855,147 to Granquist.

Sodium montmorillonite is particularly well suited as a thixotropic agent in the compositions of this invention. A level of sodium montmorillonite adequate to produce the thixotropic effect in the present compositions preferably is about 1% to about 5% by weight of the composition, and more preferably about 2% to about 4% by weight. At levels of sodium montmorillonite in excess of about 5% by weight, a loss of thixotropic properties may be experienced.

Additionally, the so-called organophilic clay gellants derived from smectite-type clays have excellent thixotropic properties when used in compositions of the present invention. These organophilic clays can be prepared by admixing the smectite-type clay with a quaternary ammonium compound, such as dimethyl di(hydrogenated tallow) ammonium chloride and water, preferably at a temperature of about 35° C. (100° F.) to about 80° C. (180° F.), and more preferably at about 60° C. (140° F.) to about 75° C. (170° F.), for a period of time sufficient for the organic compound to interact with the clay particles, followed by filtering, washing, drying and grinding. Organophilic bentonites are wellknown in the art and are described in Jordan, Phys. & Colloid Chem. 53: 294–306 (1949) and Jordan et al, Phys. & Colloid Chem. 59: 1196–1208 (1949).

Calcium oxide is present in the thermal insulating fluid of this invention preferably in an amount of about 0.5 to about 5% by weight of the composition to inhibit evaporation of the light oil component while in the environment. Calcium oxide also helps to maintain gel strength at the relatively high temperatures experienced during steam injection.

The gel strength of a fluid is the force needed to initiate movement in a gelified fluid. The gel strength of a thixotropic fluid is commonly measured in a rotational viscometer where the shear stress necessary to break the gel structure is noted. The fluid of the present invention has a gel strength of about 250 to about 300 dynes/cm$^2$, and preferably about 290 dynes/cm$^2$. If an excess of calcium oxide is present, i.e., above about 5% by weight, then precipitation occurs. The precipitate, in turn, may plug up the annular space in which the thermal insulating fluid has been placed.

Sodium silicate, $Na_2O\ mSiO_2\ nH_2O$ where m is equal to the modulus of the silicate and n is equal to the mole ratio of water, as defined in Kirk-Othmer, *Concise Encyclopedia of Chemical Technology*, pages 1058–59 (1985), incorporated herein by reference, is present as an aid to thixotropy and to reduce thermal conductivity of the fluid. Hydrated amorphous sodium silicates with a $SiO_2/Na_2O$ modulus ratio of about 3 to about 4, and preferably about 3.3, and containing about 18% water are especially preferred.

Compositions in liquid form and embodying the present invention are prepared by first combining the aforementioned solid constituents and then stirring the combination into the heavy mineral oil that has been diluted with light oil to the desired viscosity. Usually, the viscosity of the diluted heavy mineral oil is in the range of about 4,000 centipoise (cp) to about 9,000 cp at 30° C., and preferably about 5,500 cp to about 7,500 cp at 30° C. The stirring is continued until a thermal insulating fluid of substantially uniform consistency is obtained. The fluid is then ready for use, and has a viscosity in the range of about 6,000 cp to about 7,000 cp at 30° C.

Alternatively, the solid constituents of the present thermal insulating fluid compositions can be packaged separately for combination with diluted heavy mineral oil in the field.

In such a case the solid constituents are admixed in the following proportions:

| Solid Constituent | Parts by Weight | |
| --- | --- | --- |
|  | Range | Preferred |
| smectite-type clay | 1–5 | 2–4 |
| calcium oxide | 0.75–5 | 1.5–4 |
| hydrated amorphous sodium silicate | 1–2 | 2 |

While pure calcium oxide can be used to make the foregoing compositions, a convenient source for calcium oxide is quicklime, which material usually contains about 75 to about 80 percent calcium oxide.

Increase in oil viscosity due to cooling during its transit to the surface in heavy oil wells results in a slowing of the rate of transit of the oil. In order to prevent this increase in oil viscosity, a method for insulating a well, having an annular space defined by the space between the external wall of the inner tube of the well and the internal wall of the outer casing of the well, comprises filling this annular space with a thermal insulating fluid constituted by a heavy mineral oil as a major liquid portion of the composition, gas oil as a minor liquid portion of the composition, a smectite-type clay, calcium oxide and sodium silicate having an $SiO_2/Na_2O$ modulus ratio in the range of about 3 to about 4, and preferably about 3.3, and which contains about 18 wt.-% water. The thermal insulating fluid of this invention also prevents asphaltene or parafin deposition in the oil.

The thermal insulating fluid of this invention is also useful for completing a hydrocarbonaceous fluid well. This method comprises placing the thermal insulating fluid of this invention into an annular space defined by the space between the external wall of the inner tube of the well and the internal wall of the external casing of the well, followed by raising the temperature within the well bore to a value of at least about 290° C. by the injection of steam at a relatively high pressure and temperature, and then maintaining the pressure in the annular space at a level of no more than about 1200 psi during this cooking period. The duration of the steaming operation usually is about 1 day to about 5 days.

Having generally described this invention, a further understanding can be obtained by reference to certain specific examples which are provided herein for purposes of illustration only and are not intended to be limiting unless otherwise specified.

The examples which follow illustrate the effectiveness of the thermal insulation provided by the present invention.

EXAMPLE 1

Thermal Insulating Fluid

A thermal insulating fluid was prepared as follows. Sodium montmorillonite (15.0 g/l), quicklime (calcium oxide (77 wt. %); 15.0 g/l) and sodium silicate (10.0 g/l) were combined with an asphaltic-base low gravity oil, previously thinned with light oil (about 10% by volume), to a substantially uniform consistency and placed in the annulus between the tubing and casing of the high pressure vessel shown in FIG. 1. This vessel included a 2.5-cm external diameter innertube 11 which held in its center a resistance wire heater 12. This innertube, in turn, was centered inside a 6.5-cm internal diameter outertube 13. Clearance between the tube walls for placement of the fluid to be tested was 2.0 cm. The vessel was 1 meter long with welded flanges at each end. Temperature measurements were made by thermocouples 16 and 18 located on the external wall 14 of the innertube and thermocouples 20 and 22 on the internal wall 15 of the outertube. Provisions were taken to measure and control pressure surges during the evaluation of the thermal insulating fluid. Several samples were tested for precipitation of the solid materials and thixotropy before and after each test. The thermal behavior tests were carried out by maintaining the innertube of the vessel at a temperature of about 300° C. (570° F.) for about 8 hours by steam injection. During the test, the pressure of the annulus was maintained at 1200 psi. Temperatures of the inner and outertubes were recorded every 15 minutes in order to follow the temperature profile across the fluid contained in the annular space between the tube walls. The results are presented in FIG. 2. It will be noted that temperature profile stabilization occurred after the 7th hour.

EXAMPLE 2

Comparison of Insulating Properties

The insulating properties of the composition described in Example 1 were compared with a commercially available liquid insulation (KEN PAK ™ by IMCO) KEN PAK ™ is a commercial gelatinous oil casing composition which has thixotropic properties. This composition contains a low gravity asphalt base crude oil with an API gravity between 10° and 25°; a specially modified, partially saponified fatty acid chemical, and quicklime.

Figure 2:
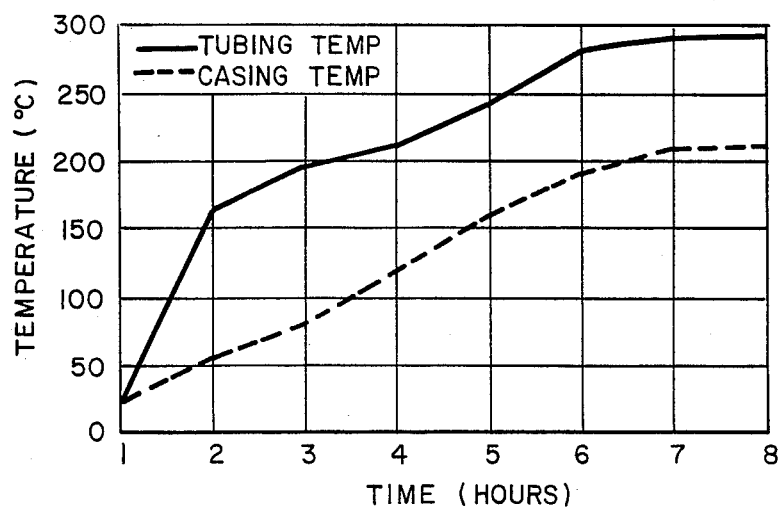
FIG. 2 is a graphical representation of test results in the high pressure vessel of FIG. 1 using a thermal insulating fluid of the present invention.
Figure 3:
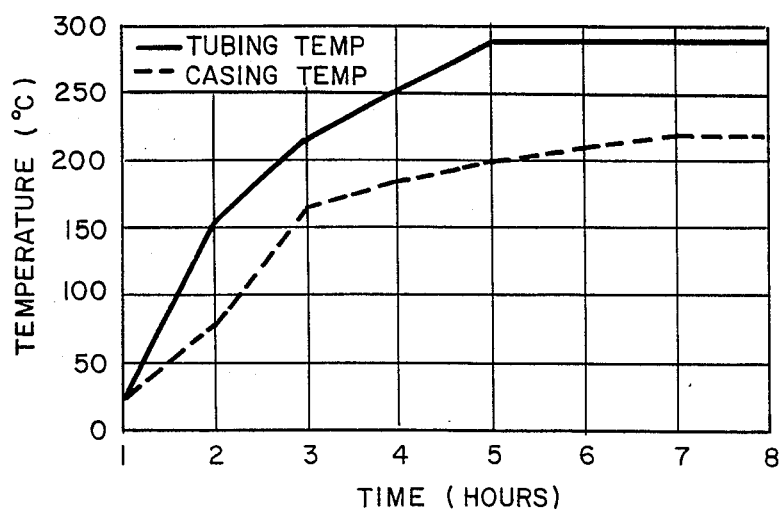
FIG. 3 is a graphical representation of the observed temperature profile of a commercial insulating fluid (KEN PAK TM) in the high pressure vessel of FIG. 1.
Figure 4:
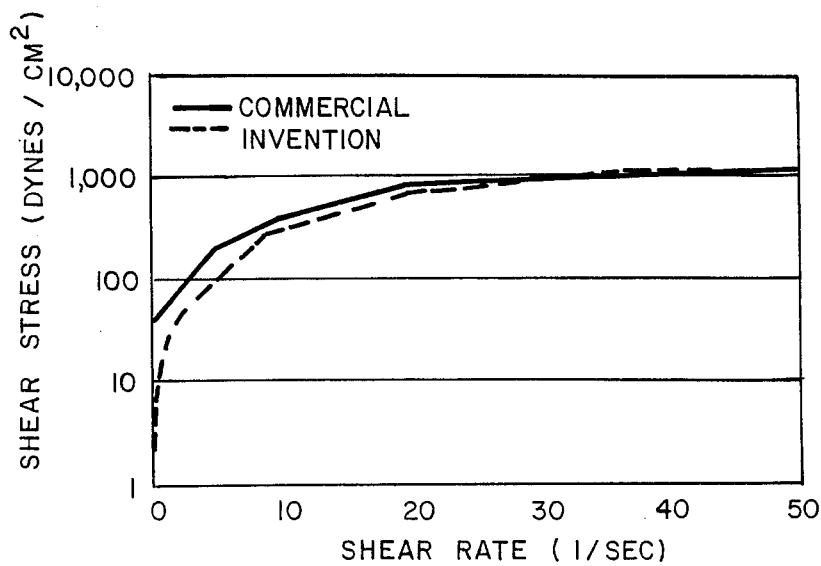
FIG. 4 is a graphical comparison of the rheological behavior of a thermal insulating fluid of the present invention with that of a commercially available thermal insulating fluid.

Both compositions were subjected to similar conditions of heat transfer inside the pressure vessel shown in FIG. 1. The observed temperature profile of the commercial insulation is shown in FIG. 3. The thixotropy of the insulating materials was comparable (FIG. 4) and assured their placement and removal from the annular space of the steam injection well. After each test, the annulus space was inspected for solid sediment. None was noted.

A thickening of the bottom part of the composition of the present invention was observed; however, the rheological properties were not aversely affected. The present composition showed good thermal stability after exposure to 300° C. for several hours.

EXAMPLE 3

Field Test

A field test of the thermal insulating fluid embodying the present invention was carried out in a well (MFB-153) in the San Tome field in Venezuela. The thermal insulating fluid was prepared by combining sodium montmorillonite (600 pounds), quicklime (550 pounds) and hydrated amorphous sodium silicate ($SiO_2/Na_2O=3.3$, 18% $H_2O$; 390 pounds) with heavy oil (16° API; 100 barrels) already diluted with light oil. Five barrels of light oil were left between liquid insulation and a dummy of the circulating mandrel so as to avoid plugging of that tool during fishing operation. The fluid was placed in the annulus of the well.

Steam (3240 tons) was injected into the well at the rate of 230 tons/day. Pressure within the well annulus was periodically released during the initial days of steam injection so as to maintain pressure within the annulus of the well at a value below about 1,000 psi. The highest annulus pressure recorded during the test was 1,470 psi.

The temperature at the bottom of the well on the third day after the steam injection operation was completed was measured to be about 278° C. (533° F.).

The maximum thermal expansion of the well casing during the test was observed to be 3.5 inches. This was a good indication of the thermal insulating properties of the present thermal insulating fluid. For comparison, a typical thermal expansion value for a similar casing insulated with KEN PAK ™ insulating fluid is about 4 inches, and insulated with nitrogen gas is about 6 inches.

During the steaming operation a hot spot was noted at the well head where the insulating fluid had been lost during the periodic pressure releases. The temperature at this hot spot was observed to be about 215° C. (420° F.) during steam injection.

One day after steam injection the annulus of the well was opened for sampling of the thermal insulating fluid. At the surface level the presence of water vapor at about 99° C. (210° F.) was noted. This could be an indication of steam leakage at the top of the injection string, inasmuch as when a sample was taken it was observed to have about 40% water present.

During recovery of the thermal insulating fluid from the annulus of the well, the fluid began to flow as soon as pressure was applied to it. The total amount of recovered thermal insulating fluid was about 97 percent of the initial volume placed in the annulus.

The field test was deemed to be successful. The field test also indicated that a substantial cost saving was obtained in comparison to insulation of an equivalent well using a commercially available insulating fluid.

Because of its rheological properties, the thermal insulating fluid is particularly well suited for placement in deviated or inclined oil wells, and also in relatively narrow oil wells.

Numerous modifications and variations of the present invention are possible in light of the above teachings. It is therefore to be understood that within the scope of the appended claims, the invention may be practiced otherwise than as specifically described herein.

We claim:

1. A thixotropic thermal insulating fluid consisting essentially of:
   (a) a heavy oil having an API gravity of not more than 15° and a water content of not more than about 5% by volume present at a concentration of about 85% to about 95% by volume of the liquid portion of said insulating fluid;
   (b) a light oil having an API gravity of at least about 20° and present at a concentration of about 5 to about 15% by volume of the liquid portion of said insulating fluid;
   (c) a smectite-type clay in an amount of about 1 to about 5% by weight of said fluid;
   (d) calcium oxide in an amount of about 0.75% to about 5% by weight of said insulating fluid; and
   (e) hydrated amorphous sodium silicate, with a $SiO_2$-$Na_2O$ modulus ratio of about 3 to about 4, present in an amount of about 1 to about 2% by weight of said insulating fluid.

2. The thermal insulating fluid according to claim 1 wherein said heavy oil is stable at temperatures up to 300° C.

3. The thermal insulating fluid according to claim 1 wherein said heavy oil has a water content of about 0.5% to about 5% by volume.

4. The thermal insulating fluid according to claim 1 wherein said heavy oil has a water content of about 1% to about 4% by volume.

5. The thermal insulating fluid according to claim 1 wherein said heavy oil has an API gravity of about 10° to about 15°.

6. The thermal insulating fluid according to claim 1 wherein said heavy oil is an asphaltic base crude oil.

7. The thermal insulating fluid according to claim 1 wherein said calcium oxide is in the form of quicklime.

8. The thermal insulating fluid according to claim 1 wherein said sodium silicate has an $SiO_2/Na_2O$ modulus ratio of about 3.3 and contains about 18 wt.-% water.

9. The thermal insulating fluid according to claim 1 wherein said smectite-type clay is sodium montmorillonite, present in a concentration of about 2% to about 4% by weight of said insulating fluid.

10. The thermal insulating fluid according to claim 1 wherein said smectite-type clay is an organophilic clay.

11. The thermal insulating fluid according to claim 1 comprising about 3% by weight of a mixture of sodium montmorillonite, calcium oxide, and hydrated amorphous sodium silicate in a weight ratio of about 3:3:2 together with, about 88.0% by volume of said heavy oil, and about 9.0% by volume of light oil.

12. A solid particulate composition suitable for admixture with extraneous heavy oil and light oil to form a thixotropic thermal insulating fluid which composition consists essentially of a smectite-type clay, calcium oxide and a hydrated amorphous sodium silicate present in a weight ratio of about 3:3:2, respectively, said sodium silicate having a $SiO_2/Na_2O$ modulus ratio of about 3 to about 4.

13. A method of preparing a thixotropic thermal insulating fluid which is well suited for the thermal insulation of steam injection wells, which comprise:

admixing a solid composition comprising a smectite-type clay, calcium oxide and a hydrated amorphous sodium silicate having a $SiO_2/Na_2O$ modulus ratio of about 3 to 4, present in a weight ratio of about 3:3:2, respectively, with about 85% to about 95% by volume of a heavy oil having an API gravity of not more than 15° and a water content of not more than about 5% by volume, and about 5% to about 15% by volume of light oil having an API gravity of at least about 20°.

* * * * *

UNITED STATES PATENT AND TRADEMARK OFFICE
CERTIFICATE OF CORRECTION

PATENT NO. : 4,877,542

DATED : October 31, 1989

INVENTOR(S) : Jesus R. Rodriguez, Olegario Rivas, and Geza N. Zirczy

It is certified that error appears in the above-identified patent and that said Letters Patent is hereby corrected as shown below:

Title Page, under "United States Patent [19]", "Lón et al." should be -- Rodriguez et al. --.

Title Page, in Section "[75] Inventors", "Jesus R. León" should be -- Jesus R. Rodriguez --.

Col. 4, line 15, "$[(Mg_{6-y}Al_y)(Si_{8-x-y})O_{20}(OH)_{4-f}F_f]xM^{+}$" should be -- $[(Mg_{6-y}Al_y)(Si_{8-x-y}Al_{x+y})O_{20}(OH)_{4-f}F_f]xM^{+}$ --.

Col. 7, line 36, "$H_2)O$" should be -- $H_2O$ --.

Col. 8, line 55, "base" should be -- based --.

Col. 10, line 7, "about 3 to 4" should be -- about 3 to about 4 --.

Signed and Sealed this

Eighteenth Day of December, 1990

Attest:

HARRY F. MANBECK, JR.

*Attesting Officer*   *Commissioner of Patents and Trademarks*